UNITED STATES PATENT OFFICE.

HENRY HOWARD, OF BOSTON, MASSACHUSETTS.

PAINT.

1,084,884.  Specification of Letters Patent.  Patented Jan. 20, 1914.

No Drawing.  Application filed January 28, 1913.  Serial No. 744,674.

*To all whom it may concern:*

Be it known that I, HENRY HOWARD, a citizen of the United States, residing at Boston, in the county of Suffolk and State of Massachusetts, have invented certain new and useful Improvements in Paints, of which the following is a specification.

My invention relates to the manufacture of inhibitive paints, for painting exposed iron-work, and for other general uses.

The object of my invention is to produce a paint which will protect iron, steel, etc., from corrosion, and which will retard, if not entirely prevent, the further corrosion of iron and steel which has already rusted to a greater or less degree.

The base of the paint is the residue remaining from the treatment of native aluminous compounds, such as bauxite, preferably red French bauxite, by alkalis, to form sodium aluminate. This residue, known to sodium aluminate manufacturers and others as "red mud," contains the part of the bauxite which is insoluble in the alkali; it contains, among other substances, a sodium aluminum silicate, which, while substantially insoluble in water, has the property of combining with and neutralizing any weak acid, such as fatty acids in oil, carbonic acid in air, etc. This material, red mud, containing the sodium-aluminum-silicate, possesses inhibiting properties to a marked degree, and when suitably mixed with oils to form a paint, has the property of protecting iron and steel from corrosion for a long time. If this paint is applied to a rusted surface, even though the rust has not been entirely removed, the iron or steel is protected from the spreading of the rust, as no further increase of corrosion is noted even after a long period of time. This inhibiting action is supposed to be due to the fact that the paint maintains a slightly alkaline condition on the surface of the iron for a long time, during which the metal is protected from corrosion.

The paint is made as follows: The red mud contains a large quantity of finely-divided matter mixed with coarser particles. The finely-divided part is separated preferably by flotation, the coarse part being rejected; or the coarse part may be separately ground and used as a mixture in other paints to impart inhibitive qualities; or the entire mass may, if desired, be ground to a suitable degree of fineness, and avoid separation. The finely-divided mass of red mud is brought into suspension in oil, either by drying and grinding in oil, or by mixing the oil directly with the wet mass, in which case the oil displaces the water, forming a paint mixture of oil and red mud. The water collecting above the paint may be drained off, the last traces being removed by heating if so desired. The oil paint mixture may be thinned if desired by a further addition of oil, or by any of the usual "thinners." The paint so produced is applied as are other ordinary paints.

I claim:

1. A rust-inhibitive paint containing "red mud," being the residue of the treatment of native aluminous compounds with alkalis.

2. A rust-inhibitive paint containing an oxygen compound of sodium, aluminum and silicon, being the residue of the treatment of bauxite with alkalis.

3. A rust-inhibitive paint containing sodium-aluminum silicate, being the residue of the treatment of native aluminous compounds with alkalis.

4. A rust-inhibitive paint containing sodium-aluminum silicate, being the residue of the treatment of bauxite with alkalis.

5. A rust-inhibitive paint containing an artificial water-insoluble oxygen compound of sodium, aluminum and silicon mixed with oil.

6. A rust-inhibitive paint containing an artificial water-insoluble sodium-aluminum-silicate mixed with oil.

In testimony whereof I affix my signature in presence of two witnesses.

HENRY HOWARD.

Witnesses:
 I. M. GRAHAM,
 M. V. O'BRIEN.